Patented Mar. 23, 1948

2,438,334

UNITED STATES PATENT OFFICE 2,438,334

KETONE PRODUCTION

Thomas F. Doumani, Long Beach, and Joseph Francis Cuneo, Los Angeles, Calif., assignors to Union Oil Company of California, Los Angeles, Calif., a corporation of California No Drawing. Application November 22, 1943, Serial No. 511,320

9 Claims. (Cl. 260—597)

This invention relates to the production of unsaturated ketones by the reaction of unsaturated hydrocarbons with organic acid halides in the vapor phase.

It is known that ketones may be prepared by the reaction of aromatic hydrocarbons with acetyl chloride in the liquid phase in the presence of Friedel-Crafts catalysts. For example, acetophenone may be prepared by the reaction of benzene with acetyl chloride in the liquid phase in the presence of at least an equi-molal amount of aluminum chloride.

It has now been found that ketones may be prepared by the reaction of olefinic hydrocarbons with acetyl chloride in the vapor phase at temperatures between about 100° C. and 500° C. and in the absence of catalysts. This is of considerable advantage, since it permits the use of a simple type of continuous operation, minimizes the degree of undesirable side reaction, and eliminates the need for the excess amounts of expensive catalysts normally required.

It is an object of the invention, therefore, to prepare unsaturated ketones by reacting unsaturated hydrocarbons with organic acid halides, non-catalytically, in the vapor phase.

The process is carried out by vaporizing the reactants, reacting the mixed vapors for the desired time period, and separating the desired ketone from the reaction products.

The unsaturated hydrocarbon is preferably a cyclic or branched chain acyclic mono-olefin, although straight chain mono-olefins may be reacted also under somewhat more strenuous conditions. Those hydrocarbons containing 4 to about 12 carbon atoms are preferred, although hydrocarbons containing 2 to about 20 or more carbon atoms may be employed. As examples of the preferred branched chain mono-olefins we may cite isobutylene, di-isobutylene, 2,3-dimethyl pentene, and the like, and especially those hydrocarbon mixtures known as polymer gasoline, prepared by polymerization of normally gaseous olefins. This term is also intended to cover naphthenic substituted olefins, such as 1- or 2-cyclohexylpropene and the like. Cyclic mono-olefins include cyclohexene, dimethyl cyclopentene, and the like. Straight chain mono-olefins include ethylene, n-butene, n-octene and the like.

The organic acid halides with which the above unsaturated hydrocarbons may be reacted are preferably the acid chlorides of the monocarboxylic acids such as acetic, propionic, butyric, cyclohexyl butyric, phenyl acetic, and the like, although the chlorides of polycarboxylic acids such as maleic, succinic and the like may also be employed in some instances, and the acid bromides, and in some instances the acid fluorides and iodides may be used. The acid chlorides of the monocarboxylic acids having 2 to about 6 carbon atoms are preferred, although the acid halides of higher acids may be employed in some cases.

As an example of the process of this invention acetyl chloride and commercial di-isobutylene were mixed at room temperature in the proportion of 1 mol of di-isobutylene to 1 mol of acetyl chloride. The mixture was vaporized and passed through a reaction zone at approximately atmospheric pressure at such a rate that the equivalent of about 0.6 volumes of combined feed (measured as liquid at room temperature) passed through each volume of reaction zone per hour, i. e., the feed rate was approximately 0.6 V./V. The temperature of the reaction zone was held at about 200° C. (392° F.)

The ketone produced in the above operation was separated from the reaction product by distillation and was found to be a mixture composed predominantly of two methyl octenyl ketone isomers having the following structures:

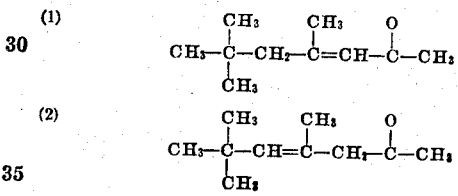

The alpha-beta unsaturated isomer (1) predominated, but there was a considerable proportion of form (2) also present, as well as small amounts of related isomers and saturated chloroketones. The reason for this production of various isomers is that the di-isobutylene feed is a mixture of isomers itself, and there is a possibility of some catalytic isomerization of either the feed or the products during the course of reaction. The chloroketones may have been formed by direct addition of the acetyl chloride to the double bond of the olefin, and the unsaturated ketone may have been produced by elimination of HCl from the chloroketone. We do not limit ourselves by this theory, however.

Other ketones may be produced by similar reactions between other unsaturated hydrocarbons and organic acid halides as described above. The reaction temperatures between about 150° C. and 300° C. are preferred. The pressure may be reduced below atmospheric if necessary, to keep the reactants in the vapor phase; or pressures above atmospheric may be employed, as long as the reaction is essentially vapor phase. The ratio of acid halide to unsaturated hydrocarbon is preferably between about 2 to 1, and about 20 to 1, although higher or lower ratios may also be employed.

It has also been found that an analogous reaction to the above reaction between unsaturated hydrocarbons and organic acid halides may be carried out with unsaturated hydrocarbons and organic acid anhydride derivatives in the presence of organic or inorganic halides. The term "organic acid anhydride derivatives" is meant to include not only the organic acid anhydrides themselves, but also the corresponding organic acids and the corresponding ketene homologs and mixtures thereof. The relationship between these various derivatives becomes apparent when it is observed that organic acid anhydrides may be prepared by the reaction between the corresponding acid and the corresponding ketene. Acetic acid, for example, will react with ketene itself to form acetic anhydride. It may further be noted that organic acid chlorides may be prepared by the reaction between the corresponding acid anhydride and certain halides. For example, acetic acid will react with ketene to form acetic anhydride, which will in turn react with phosphorus pentachloride to yield acetyl chloride. It is possible therefore that the reaction between the unsaturated hydrocarbons and the organic acid anhydride derivatives in the presence of certain halides, proceeds through the formation of the organic acid halide by a preliminary reaction between the organic acid anhydride and the halide, followed by the previously described reaction between the resulting organic acid halide and the unsaturated hydrocarbon. The mixture of organic acid anhydride derivative and halide is therefore termed an "organic acid halide producing mixture" herein, although it is not intended that the invention be limited by this theory.

It is an object of this invention accordingly, to provide a process for the production of unsaturated ketones by the vapor phase reaction between an unsaturated hydrocarbon and an organic acid halide producing mixture.

The organic acid anhydride derivatives which may be used include the derivatives of carboxylic acids having 2 or more carbon atoms and include the carboxylic acids themselves, the acid anhydrides, and the ketenes. The ketenes corresponding to acetic, butyric, and 2 cyclohexyl butyric acids, for example are ketene, ethyl ketene, and 2,2-ethyl cyclohexyl ketene, respectively. Derivatives of other monocarboxylic and polycarboxylic acids may also be employed, such as those given above for the acid halides, the preferences there listed also applying to the corresponding acid anhydride derivatives here.

The halides which may be used with the above organic acid anhydride derivatives in the organic acid halide producing mixtures may be metal or non-metal halides. Among the metal halides, those of the metals of groups II and VIII of the periodic system, especially calcium and cadmium, and iron and cobalt, are preferred, although halides of antimony and tin are also suitable. These are all polyvalent metals. These may be distended on suitable carriers if desired, such as carbon, gels such as alumina, silica and the like, or porous ceramics such as tile, brick, etc.

Among the non-metal halides, the hydrogen halides are preferred, although alkyl halides such as ethyl, isobutyl, and the like may be used. The halides include the chlorides, bromides, fluorides and iodides, although the chlorides and bromides of the metals, and the chlorides and fluorides of the non-metals are preferred.

In carrying out the reaction between the unsaturated hydrocarbon and the organic acid halide producing mixtures, the halides may remain in the reaction zone, or may be passed through the reaction zone with the other reactants, or both. Obviously, the metal halides need not be in the vapor phase. As examples, a metal halide may be used in a fixed bed in the reaction zone; a non-metal halide may be passed through the reaction zone concurrently with the vapors of the unsaturated hydrocarbon and the organic acid halide; a metal halide may be used in a fixed bed in the reaction zone while a non-metal halide is passed through with the olefin and acid halide; or a solid or liquid metal or non-metal halide may be passed through the reaction zone concurrently or countercurrently to the olefin and the acid halide.

As an example of the process of this invention, acetic anhydride and commercial di-isobutylene were vaporized and mixed in the proportion of 8 mols anhydride to 1 mol olefin, and the mixture was passed over 100 ml. of a metal halide-containing solid at a rate of 0.5 to 1.0 ml. (measured as liquid at about 45° C.) per minute i. e., at a V./V. of about 0.3 to 0.6, at a temperature of about 200° C. About 40% of the olefin was converted to ketone in a single pass under these conditions. The metal halide containing solid employed consisted of 3 to 8 mesh Alorco activated alumina (a product of the Aluminum Ore Company of America) which had been impregnated with ferric chloride by allowing it to soak in a saturated aqueous solution of $FeCl_3$ for a period of about one hour at room temperature, then decanting the solution and drying the soaked alumina.

The ketone produced in the above operation was similar in character to that produced in the previous example described above. Similarly, ketones may be prepared with the other reactants and under the other reaction conditions shown above.

The separation of the ketones from the reaction product may usually be readily accomplished by fractional distillation, especially if narrow-boiling fractions or pure compounds are employed as the unsaturated compounds. It is also possible to use other conventional methods of separation, however, such as extractive distillation, azeotropic distillation and solvent extraction.

Other modifications of the invention which would occur to one skilled in the art are to be considered as part of the invention as defined in the following claims.

We claim:

1. A process for the production of unsaturated ketones which comprises reacting an olefinic hydrocarbon with a material selected from the class consisting of acid halides of monocarboxylic acids having between 2 and 6 carbon atoms and acid halide producing mixtures consisting essentially of a polyvalent metal halide plus an anhydride of a monocarboxylic acid having between 2 and 6 carbon atoms at a temperature above about 150° C. and a pressure not substantially greater than atmospheric, in the vapor phase, and thereby producing an unsaturated ketone.

2. A process according to claim 1 in which the olefinic hydrocarbon is a branched chain mono-olefin.

3. A process according to claim 1 in which the olefinic hydrocarbon is a cyclic mono-olefin.

4. A process for the production of unsaturated ketones which comprises reacting a mono-olefinic hydrocarbon with an acid halide of a monocarboxylic acid having between 2 and 6 carbon atoms at a temperature above about 150° C. and a pressure not substantially greater than atmospheric, in the vapor phase, and thereby producing an unsaturated ketone.

5. A process for the production of an unsaturated methyl ketone which comprises non-catalytically reacting a branched chain mono-olefin with acetyl chloride at a temperature between about 150° C. and 300° C. and a pressure not substantially greater than atmospheric, in the vapor phase, and thereby producing said unsaturated methyl ketone.

6. A process for the production of unsaturated ketones which comprises reacting an olefinic hydrocarbon at a temperature greater than about 150° C. and a pressure not substantially greater than atmospheric, in the vapor phase, with a carboxylic acid halide producing mixture comprising an anhydride of a monocarboxylic acid having between 2 and 6 carbon atoms and a polyvalent metal halide, and thereby producing an unsaturated ketone.

7. A process according to claim 6 in which the carboxylic acid anhydride is acetic anhydride.

8. A process according to claim 6 in which the carboxylic acid anhydride is acetic anhydride and the halide is a halide of a metal of group VIII.

9. A process for the production of unsaturated ketones which comprises reacting a mono-olefinic hydrocarbon with a chloride of a monocarboxylic acid having between 2 and 6 carbon atoms, at a temperature above about 150° C. and a pressure not substantially greater than atmospheric, in the vapor phase, and thereby producing an unsaturated ketone.

THOMAS F. DOUMANI.
JOSEPH FRANCIS CUNEO.

REFERENCES CITED

The following references are of record in the file of this patent:

UNITED STATES PATENTS

| Number | Name | Date |
|---|---|---|
| 1,737,203 | Schoeller | Nov. 26, 1929 |
| 2,006,198 | Frolich | June 25, 1935 |
| 2,105,792 | Nelles | Jan. 18, 1938 |
| 2,194,704 | Kroeger | Mar. 26, 1940 |
| 2,210,837 | Kastner | Aug. 6, 1940 |
| 2,315,046 | Byrns | Mar. 30, 1943 |